(12) United States Patent  
Chandrashekar et al.

(10) Patent No.: US 12,063,414 B2  
(45) Date of Patent: *Aug. 13, 2024

(54) METHODS AND SYSTEMS FOR SELECTIVE PLAYBACK AND ATTENUATION OF AUDIO BASED ON USER PREFERENCE

(71) Applicant: Rovi Guides, Inc., San Jose, CA (US)

(72) Inventors: Padmassri Chandrashekar, Karnataka (IN); Daina Emmanuel, Bangalore (IN); Reda Harb, Issaquah, WA (US); Jayshil Parekh, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,991

(22) Filed: Apr. 18, 2023

(65) Prior Publication Data

US 2023/0254531 A1 Aug. 10, 2023

Related U.S. Application Data

(63) Continuation of application No. 17/377,831, filed on Jul. 16, 2021, now Pat. No. 11,665,392.

(51) Int. Cl.
*H04N 21/439* (2011.01)
*G06F 16/635* (2019.01)
*H04N 21/2343* (2011.01)

(52) U.S. Cl.
CPC ....... *H04N 21/4396* (2013.01); *G06F 16/635* (2019.01); *H04N 21/234336* (2013.01)

(58) Field of Classification Search
CPC ....... H04N 21/234336; H04N 21/4394; H04N 21/4396; H04N 21/4755; H04N 21/4884; G06F 16/635
See application file for complete search history.

(56) References Cited

U.S. PATENT DOCUMENTS

| | | | | |
|---|---|---|---|---|
| 8,175,298 | B2* | 5/2012 | Mitani | H04N 5/60 381/74 |
| 8,201,211 | B2* | 6/2012 | Proust | G06F 21/575 707/999.203 |
| 8,351,624 | B2* | 1/2013 | Motomura | H04N 21/43635 348/706 |
| 8,838,911 | B1* | 9/2014 | Hubin | G11B 20/10527 711/147 |
| 9,390,085 | B2* | 7/2016 | Bhattacharya | G10L 17/26 |
| 2006/0161958 | A1* | 7/2006 | Choung | H04N 21/4122 725/78 |
| 2007/0046835 | A1* | 3/2007 | Kim | H04N 21/42204 348/731 |

(Continued)

*Primary Examiner* — Michael B. Pierorazio
(74) *Attorney, Agent, or Firm* — HALEY GUILIANO LLP

(57) ABSTRACT

Systems and methods are presented for providing to filter unwanted sounds from a media asset. Voice profiles of a first character and a second character are generated based on a first voice signal and a second voice signal received from the media device during a presentation. The user provides a selection to avoid a certain sound or voice in association with the second character. During a presentation of the media asset, a second audio segment is analyzed to determine, based on the voice profile of the second character, whether the second voice signal includes the voice of a second character. If so, the second voice signal output characteristics are adjusted to reduce the sound.

20 Claims, 9 Drawing Sheets

(56) References Cited

U.S. PATENT DOCUMENTS

| | | | | |
|---|---|---|---|---|
| 2008/0063216 A1* | 3/2008 | Sakata | H04S 3/008 | 381/80 |
| 2008/0309830 A1* | 12/2008 | Motomura | H04N 21/43635 | 348/E5.122 |
| 2008/0320545 A1* | 12/2008 | Schwartz | H04N 21/8541 | 725/135 |
| 2010/0315553 A1* | 12/2010 | Takatsuji | G09G 5/006 | 348/E9.034 |
| 2010/0321479 A1* | 12/2010 | Yang | H04N 21/816 | 348/51 |
| 2011/0051002 A1* | 3/2011 | Oh | H04N 5/765 | 348/569 |
| 2011/0068736 A1* | 3/2011 | Chartier | H02J 7/00 | 320/137 |
| 2011/0113442 A1* | 5/2011 | Kikkawa | G09G 5/006 | 725/25 |
| 2011/0134338 A1* | 6/2011 | Toba | H04N 5/765 | 348/734 |
| 2011/0142245 A1* | 6/2011 | Toba | G11B 20/10527 | 381/22 |
| 2011/0176057 A1* | 7/2011 | Okamura | H04N 21/439 | 348/554 |
| 2011/0234916 A1* | 9/2011 | Fujita | H04N 5/60 | 348/E5.122 |
| 2011/0289410 A1* | 11/2011 | Paczkowski | G11B 27/034 | 379/202.01 |
| 2012/0002562 A1* | 1/2012 | Kawade | H04N 5/765 | 370/252 |
| 2012/0030728 A1* | 2/2012 | Yukawa | G06F 9/44 | 725/151 |
| 2012/0042346 A1* | 2/2012 | Yoshida | H04N 21/4363 | 725/81 |
| 2012/0136612 A1* | 5/2012 | Vanderhoff | H04N 17/004 | 702/119 |
| 2012/0188456 A1* | 7/2012 | Kuroyanagi | H04N 5/765 | 348/731 |
| 2012/0307157 A1* | 12/2012 | Utsunomiya | H04N 21/43622 | 348/707 |
| 2013/0021536 A1* | 1/2013 | Kamida | H04N 21/43622 | 348/739 |
| 2013/0051578 A1* | 2/2013 | Chu | H04B 1/123 | 381/94.1 |
| 2013/0051584 A1* | 2/2013 | Higuchi | H04N 21/8106 | 381/123 |
| 2013/0223538 A1* | 8/2013 | Wang | H04N 21/43637 | 375/E7.027 |
| 2013/0292311 A1* | 11/2013 | Shaw | E03F 5/042 | 137/15.01 |
| 2014/0193134 A1* | 7/2014 | Maeda | H04N 21/43072 | 386/231 |
| 2015/0077633 A1* | 3/2015 | Lee | H04N 21/4392 | 348/515 |
| 2015/0149173 A1* | 5/2015 | Korycki | G10L 17/00 | 704/246 |
| 2015/0179167 A1* | 6/2015 | Chekhter | G10L 15/18 | 704/257 |
| 2018/0285059 A1* | 10/2018 | Zurek | G06F 40/35 | |
| 2021/0319779 A1* | 10/2021 | Aher | G10L 13/0335 | |
| 2023/0018555 A1 | 1/2023 | Chandrashekar et al. | | |

* cited by examiner

METHODS AND SYSTEMS FOR SELECTIVE PLAYBACK AND ATTENUATION OF AUDIO BASED ON USER PREFERENCE

CROSS-REFERENCE TO RELATED APPLICATION

This application is a continuation of U.S. patent application Ser. No. 17/377,831, filed Jul. 16, 2021, the disclosure of which is hereby incorporated by reference herein in its entirety.

BACKGROUND

The present disclosure relates to methods and systems for controlling sounds of a media asset and, more particularly, to methods and systems for identifying and adjusting output characteristics of unwanted sounds from a media asset.

SUMMARY

Audio and video continue to play an essential role in the entertainment and educational sectors. For example, movies, news and sports events are consumed via a consumption device for entertainment purposes. However, conventional entertainment systems do not permit consumers to adjust specific features of a movie or show being consumed. For example, a user may want to focus on certain parts of a movie but is distracted by other sounds (e.g., crowds cheering, explosions, background noise), which are disruptive to the user's enjoyment of the movie or show. With many consumers consuming movies, shows and news events, each consumer may have a unique way they prefer to consume the movies, shows and news events, but be limited to consuming the movie in the same way as everyone. Further, users often consume shows and movies in places that do not afford them quiet or uninterrupted time to consume the content, and unwanted sounds can often be heard from the background of the content. One way to prevent the transmission of such unwanted sounds (e.g., a commercial or commentator) is to manually mute the sound. However, this usually requires constant inputs from a user using a remote. Ultimately, dynamic selective playback and audio attenuation based on user preference is needed to improve user enjoyment.

To overcome these problems, systems and methods are disclosed herein for filtering unwanted sounds from a media asset streaming to a consumption device. During media asset streaming, the audio and video tracks may be transmitted to the consumption device as separate segments, and then played in sync by the consumer device, e.g., player software. For example, the consumer device makes HTTP GET requests for the audio files or segments and the video fragments of a media asset. The video and the audio segments can also be muxed, where decoders (e.g., audio decoder, video decoder) at the client consumption devices process the streams in order to output both via display/speakers. The system is configured to identify the many sounds of the media asset, catalog the many sounds, and, based on consumer preferences, suppress or mute any one or more sounds that are not desirable to the consumer. The consumption device receives a media asset in the form of a manifest file that includes audio, video, metadata and other information. For example, a movie, a show, a newscast, or a sporting event is presented on the consumption device with a corresponding audio stream and video stream, which are presented in a synchronized manner. The consumption device receives a selection of sound profiles. For example, the consumption device receives a selection to focus on commentary, background noise or a particular subject or a particular commentator. The system identifies a plurality of audio segments from the audio stream. References to such audio segments containing sound profiles can be parsed and presented by the consumer device's User Interface UI engine to enable the consumer to select which entity (if any) to mute. Each audio segment is associated with a sound profile and metadata that identifies the audio source. For example, a first audio segment is of one commentator on the sporting event, and a second audio segment is of a second commentator on the sporting event. The audio segments are overlaid over each other and synchronized to the video stream. The system determines a first audio segment of the plurality of audio segments and a second audio segment of the plurality of audio segments, where the sound profile and metadata of the first audio segment match the received selection and the sound profile and metadata of the second audio segment do not match the received selection. For example, the received selection is to listen to background noise, a particular commentator, or an event within a game (e.g., a touchdown or exciting play) or to exclude a particular noise or commentator. For example, the user may want to avoid commentator Tony Romo when watching "Monday Night Football." As a result, in response to determining the second audio segment includes Tony Romo, the segment does not match the received selection, and the system automatically adjusts the output characteristic of the second audio segment while the media asset is presented on the consumption device. In some embodiments, the sound of Tony Romo is muted. In further embodiments, the sound is converted to text and presented on a display of the consumption device.

A sound profile of each segment is generated based on identifying different sound sources from the media asset, for example, the different people speaking during a presentation of the media asset, such as characters in a movie. The audio segments may be generated by identifying a base frequency of the first voice signal and determining a plurality of voice characteristics, such as pitch, intonation, accent, loudness, and speech rate. This data may be stored in association with a first character. During the presentation of the media asset, a second audio segment may be identified by the consumption device, based on the sound profile of a second character, if the second audio segment includes the sound of the second character. In some embodiments, the first sound signal is attributed to the background noise of a crowd cheering, and the second sound signal is attributed to a commentator. Based on the received selection of content, the system may adjust the audio segment that does not match user preferences. For example, the second audio segment may be prevented from being transmitted to the consumption device for the presentation of the media asset. In another embodiment, the second audio segment is transmitted to the consumption device and is muted at the consumption device while the media asset is presented. A sound profile of the second character may be generated from the second audio segment for future use.

In some embodiments, the second audio segment is identified using a closed-caption processor. For example, the system transmits to the consumption device a closed-caption file associated with the audio of the media asset. The closed-caption processor synthesizes the text to identify different sounds (e.g., the first speaker, second speaker, background, or foreground sounds) of the media asset. In some embodiments, the system searches the closed captions of the media asset to identify a speaker in each audio segment of the plurality of segments. Based on identifying the speaker in each audio segment, the system compares the identified speaker against a list of permitted speakers (e.g., Tony Romo). Based on comparing the speakers to the list, the system may mute one or more audio segments with speakers who are not on the list of permitted speakers.

In some embodiments, the system mutes the second audio segment during the presentation of the media asset. In some embodiments, the muting is performed for a period of time, for example, 15 seconds, a predetermined period of time or until the noise has dissipated. For example, a touchdown is scored, if the user prefers to hear the analysis and avoid the cheering crowd, the system may identify the audio segment of the cheering crowd and mute the audio segment for a minute while the commentators continue with their analysis. Alternatively, in some embodiments, the transmission of the identified audio segment into the media asset may be prevented for a predetermined period of time. After the predetermined period of time passes, the second audio segment may resume at the previous volume. In some embodiments, rather than waiting for a predetermined period of time, the audio segment may be continuously sampled. Once the sampled audio is determined to no longer include the voice of the second speaker (e.g., crowd), the system may unmute the second segment and/or transmission of the second audio segment into the media asset may be resumed.

Other methods of generating audio segments may also be employed. For example, each audio segment may be transcribed into corresponding text. The user profile may contain a list of sound sources the user prefers. If the identified sound source matches a sound source on the list of sound sources, then the audio segment is identified as corresponding to the sound source and permitted to be presented on the consumption device. As another example, after transcribing the audio stream of the media asset to a corresponding text, the system may identify audio segments attributed to sound profiles, and the text may be processed to determine a language usage level. For example, a language usage level may be based on vocabulary (e.g., number and/or complexity of words), rate of speech, grammatical structures, or other linguistic features. On average, a child will have a lower language usage level than an adult. Thus, the language usage level can be used to determine the sound profile. The usage level is compared with the plurality of voice characteristics. If the usage level matches the voice characteristic of the plurality of voice characteristics of the first speaker, then the first voice signal is identified as corresponding to the first speaker.

Unwanted sounds may be filtered from a media asset using speech analysis performed at a server or at the consumer device. In some embodiments, a manifest file is transmitted to the consumer device with the associated metadata with each of the sounds and speakers already identified. In some embodiments, the consumer device relies on metadata inserted at the encoder to automatically and selectively mute/unmute audio segments of the media asset. In another embodiment, the audio segment is intentionally omitted from being included in the manifest file that player receives (e.g., during a live streaming session, the player constantly receives updated manifest). In yet another embodiment, the audio segment associated with an entity (e.g., commentator) and sent to the consumption device is blank. A consumption device may identify a first audio segment during a presentation of the media asset based on the segment referenced in a manifest file. The system may identify a first audio segment which may be converted into corresponding text or a closed caption segment may be part of the manifest file, which is then analyzed to determine the source of the audio segment. Similarly, each of the audio segment may be converted to a corresponding text or may contain a closed caption segment, which is then analyzed to determine that it was spoken by a second speaker (a different speaker than the first speaker). The relevance of each identified speaker to the media asset is determined. If the first speaker is relevant to the media asset (or selected as the preferred speaker by the user) while the second speaker is not, the first audio segment is presented for the consumption device and the second audio segment identified as spoken by the second speaker is prevented from being transmitted into the media asset. In some embodiments, the volume of the second audio segment is adjusted down to improve the user's enjoyment by presenting content the user prefers and preventing disruptions. In some embodiments, the volume of the second audio segment is muted to prevent the presentation of the audio. For example, the user profile has indicated that the user does not want to listen to Tony Romo as the commentator. The system mutes the audio segment when Tony Romo is speaking while presenting the audio segment of other commentators or the crowd. In some embodiments, the text corresponding to the second audio segment (e.g., Tony Romo speaking) may be presented on the display of the consumption device while the second audio segment is muted. For example, while Tony Romo's verbal commentary is muted, the system causes to be presented the corresponding text. The corresponding text is inserted in the display. In some embodiments, the system, at the server, converts the corresponding text of the second audio segment into a third audio segment that matches the sound profile of the received selection—for example, the voice of another commentator or a computer-generated commentator that automatically reads the corresponding text. The third audio segment is inserted into the manifest file and is transmitted into the presentation of the media asset in place of the second audio segment on the consumption device. In yet another embodiment, the consumption device presents an option to select whether to present the corresponding text of the second audio segment or listen to the third audio segment. In such a case, the system transmits one or more manifest files that are presented on the consumption device based on the response received.

If the first audio segment is determined to match the sound profile and the second audio segment does not match the sound profile, then the system may convert the second audio segment to text that synthesizes the voice of the second speaker or may access the closed caption file (when one is available) for the media asset. For example, many TV services utilize live closed-captioning software to transcribe an audio with spoken words (i.e., dialogue) or even detect non-speech elements such as sounds (thunder, baby crying, dog barking, crowds cheering, etc.). Most of these solutions (e.g., IBM's CC software) are powered by AI and automatic speech recognition (ASR) software. The output is fed to a CC encoder and delivered to end users. The CC data can be embedded into the video or delivered separately in what's known as a 'sidecar' file. The video and associated audio transcription are presented in sync since the player receives the text as well as timing information. In some embodiments, both segments are transmitted to the consumption device to be presented with the media asset, while muting the second audio segment. In some embodiments, the first audio segment is transmitted separately into the media asset, while the second audio segment is replaced with a place holder. In some embodiments, where both audio segments are transmitted into the media asset, a user interface element, such as a dialog box, may be presented on the consumption device allowing the user to select to which of the two audio segments he or she would like to listen. In some cases, the transcribed text may be transmitted to a remote server at which the voice synthesis occurs. In some embodiments, the closed caption for the media asset is used to instead of transcribing the audio to text. This may reduce the load on the media device to allow for a smoother presentation experience (e.g., less video or audio buffering).

In some embodiments, during a live stream, the sidecar file is sent as transcription becomes available since there's no way to know what an actor or a news anchor will say 'in the future'—e.g., 5 minutes from the current time. Additionally, the cloud-based CC software can transmit information about the speaker (e.g., name of commentator 1 and 2 during a sports event) so that the closed-caption data displays such information. Such capability can be available via the use of software to detect who the speaker is via video/audio analysis. In some embodiments, the speakers or characters that can be automatically muted are based on the entities present in the closed-caption data/file (e.g., commentator 1 or 2) or even non speech elements (e.g., crowds cheering).

In some embodiments, the system further includes transmitting, to the server, preferences associated with a user profile. The user profile may contain a database of user preferences indicating what the user prefers to listen to when a media asset is presented on a consumer device, for example, when an evening news report provides news about weather, traffic and other events. The user may prefer a local news report and avoid traffic reports or weather reports. The system, as the server, may search for audio segments of the media asset that are acceptable (e.g., local news report) to the user profile based on the preferences. The system may then transmit to the consumer device the acceptable audio segments (e.g., local news report) and omit transmitting audio segments (e.g., traffic and weather reports) the user prefers to avoid. In some embodiments, in place of audio segments the user prefers to avoid, the system may send blank audio files, or replacement audio files, or placeholders. This may reduce the load on the consumption device to allow for a smoother presentation experience (e.g., less video or audio buffering).

In some embodiments, the user of the consumer device may provide instructions regarding specific individuals (e.g., actors, sports commentators, speakers, background music, etc.) or sounds (e.g., crowd cheering) in a media content stream (e.g., live or on-demand). The consumption device may perform actions on the output characteristics (e.g., mute, adjust volume, etc.) associated with a specific individual or sound while still displaying the closed caption associated with the individual (i.e., a viewer can read what the specific individual is saying, but not hear what they're saying). In one embodiment, a viewer's profile can contain a list of entities associated with a specific show(s) or content to automatically block. Such data can become part of the user's profile/preferences. Additionally, the list can also include certain sounds to block (i.e., background music, etc.). In yet another embodiment, the viewer can specify which characters/sounds to not output before playback of the actual content (e.g., for on-demand content).

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
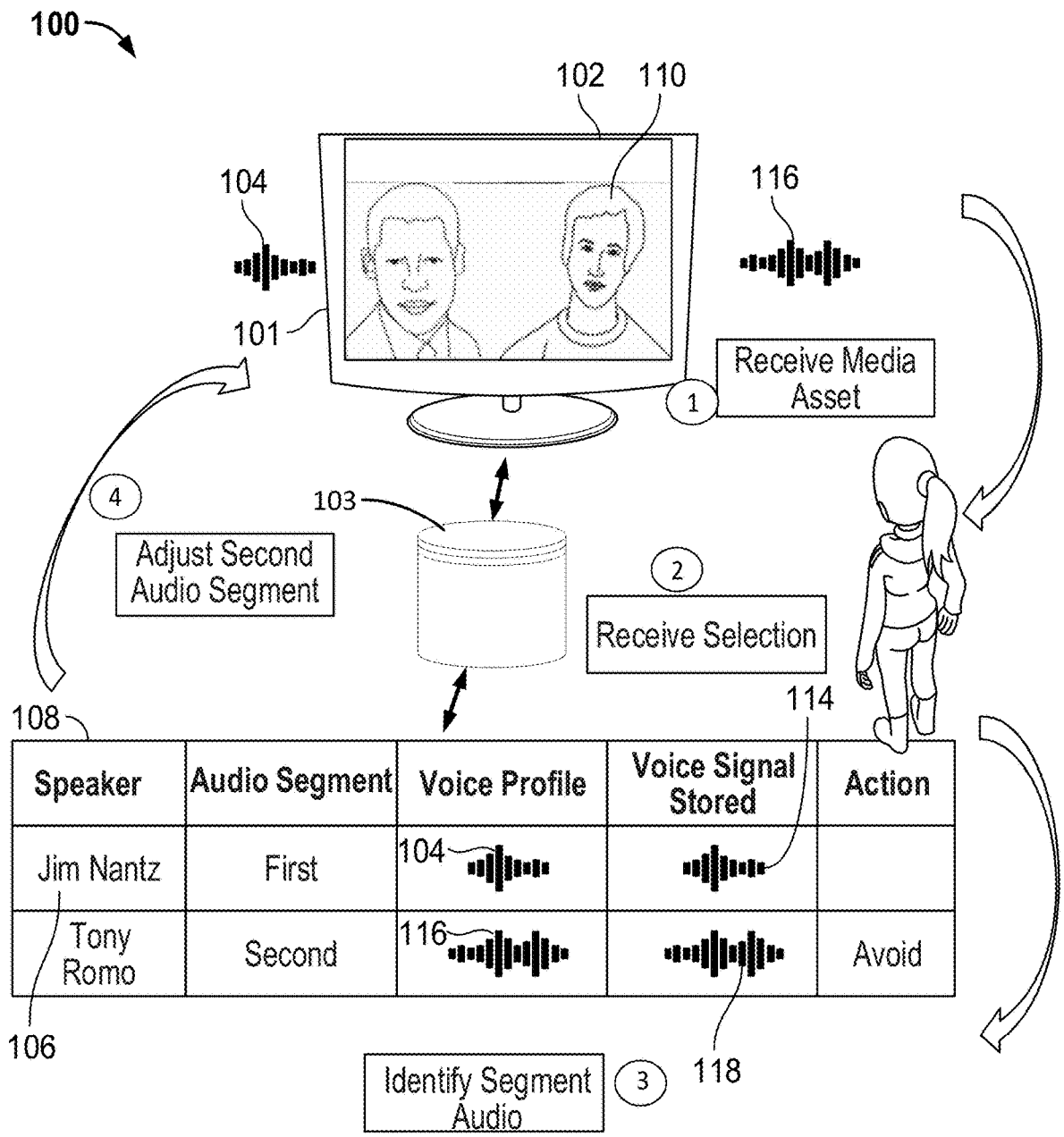
FIG. 1 shows (a) an exemplary scenario in which unwanted sounds are present during a media asset, and (b) data associated with each sound, in accordance with some embodiments of the disclosure.

FIG. 1 shows (a) an exemplary scenario 100 in which unwanted sounds are identified from a presentation of the media asset, and (b) data associated with each sound, in accordance with some embodiments of the disclosure. In scenario 100, a consumption device 102 receives a media asset for presentation. The media asset may be a movie, a news report, a weather report, a sports report, or a sports event including commentators. For example, the consumption device 102 may be a phone, a cell phone, a smartphone, a tablet, a laptop computer, a desktop computer, or any other device capable of presenting content for consumption, whether live, recorded or streamed over the Internet. In one example, the consumption device 102 receives a football presentation where two commentators are providing an analysis. A first commentator 101 (e.g., Jim Nantz) is participating in a presentation of a football game on consumption device 102. During the presentation of the media asset, based on a first voice signal 104, corresponding to the voice of the first commentator 101, the system may generate a voice profile 106 of the first commentator, which is stored in profile list 108 stored on the server or a database 103. For example, a one- or two-second sample of the voice of first commentator 101 may have been used to identify and generate a voice profile for the first commentator. In some cases, several such samples may be identified, and an average of each voice characteristic identified therein is used to generate the voice profile of the first commentator. Alternatively or additionally, the consumption device 102 may be prompted to learn first commentator 101's voice characteristics to train consumption device 102 to recognize his or her voice. The consumption device may identify a commentator moving his or her mouth to pinpoint which commentator is speaking. In some embodiments, a manifest file containing the information related to the speakers in the media asset may be transmitted to the consumption device. In some embodiments, the manifest file may include a closed caption received with the media asset may identify the speaker before each verse. For example, the name "Jim" may appear in the caption to indicate that Jim is speaking. In some embodiments, the consumption device 102 may build a voice profile or sound profile of first commentator 101 based on the audio stream accompanying the media asset presentation while the first commentator 101 is speaking. In some embodiments, the consumption device 102 may receive from the server a voice profile or sound profile of first commentator 101 based on the audio stream accompanying the media asset presentation while the first commentator 101 is speaking. In another example, the consumer may be consuming a horror movie and may prefer to avoid jolting and dramatic sounds by reducing the volume or muting the volume of the background sounds. In still another example, while a consumer is in a vehicle (as a driver or passenger) and may be occupied with another task, the consumer may not want to be distracted by the background noise of a soccer stadium and instead may want to focus on the conversation in the media asset, which will enhance the user experience.

During the media asset presentation, a second speaker 110 may be identified, such that sounds made by second speaker 110 may be picked up by a server or consumption device 102 and transmitted into the presentation of the media asset. For example, as shown in FIG. 1, two sports commentators, Jim Nantz and Tony Romo, are covering a football game. A first voice signal 104 is received and identified from the audio stream of the media asset by the control circuitry on a server consumption device 102 and compared to stored voice profiles in profile list 108. In some embodiments, the audio stream of the media asset is processed and tagged based on the different sounds. For example, each frame of the audio segment may be tagged when a first person is speaking or when a second person is speaking. Based on the comparison, consumption device 102 determines that stored voice signal 114 matches voice signal 104 of first commentator 101. Consumption device 102 may store the captured voice signal 114 in a data field associated with voice profile 106 for the first commentator 101. Voice signal 114 is allowed to be transmitted (from a server via a manifest file or another way) into the consumption device based on the received instruction from the user device because it matches the voice profile 104 of first commentator 101.

In some embodiments, media asset data (via a manifest file) from server database 103 (e.g., content item source) may be provided to consumption device 102 using a client/server approach. For example, consumption device 102 may pull content item data from a server (e.g., server database 103), or a server may push content item data to consumption device 102. In some embodiments, a client application residing on consumption device 102 may initiate sessions with profile list 108 to obtain manifest files including audio segments when needed, e.g., when the manifest file is out of date or when consumption device 102 receives a request from the user to receive data.

Media asset and/or manifest files delivered to consumption device 102 may be over-the-top (OTT) media asset. OTT media asset delivery allows Internet-enabled user devices, such as consumption device 102, to receive media asset that is transferred over the Internet, including any media asset described above, in addition to media asset received over cable or satellite connections. OTT media asset is delivered via an Internet connection provided by an Internet service provider (ISP), but a third party distributes the media asset. The ISP may not be responsible for the viewing abilities, copyrights, or redistribution of the media asset, and may only transfer IP packets provided by the OTT media asset provider. Examples of OTT media asset providers include YouTube™, Netflix™, and HULU™, which provide audio and video via manifest file. YouTube™ is a trademark owned by Google Inc., Netflix™ is a trademark owned by Netflix Inc., and Hulu is a trademark owned by Hulu™. OTT media asset providers may additionally or alternatively provide manifest files described above. In addition to media asset and/or manifest files, providers of OTT media asset can distribute applications (e.g., web-based applications or cloud-based applications), or the media asset can be displayed by applications stored on consumption device 102.

Second voice signal 116 is also identified by consumption device 102 as a second audio segment from the audio stream of the media asset. Voice profile 116 was identified as attributed to second commentator 110. For example, second voice profile 116 may be identified immediately prior to, or immediately following, first voice profile 104. Consumption device 102 compares voice profile 116 to known voice profiles in profile list 108. Media device 102 determines that voice profile 116 does not match any known voice profiles or matches a profile for which a selection was received to avoid content from this profile. Consumption device 102 or server database 103 may nevertheless track the captured voice signal 116 in a data field 118 associated with an unknown speaker or an unwanted sound. Since it does not match voice profile 104 of first speaker 101, voice profile 116 is not allowed to be transmitted into the presentation of the media asset on the consumption device. In some embodiments, the voice signal 116 is transmitted into the presentation of the media asset while the output characteristics are adjusted. For example, the volume for the audio segment where the voice profile 116 is identified is modified. In another example, the volume for the audio segment where the voice profile 116 is identified is muted. In another example, second voice profile 116 is identified concurrently with first voice profile 104. Consumption device 102 may determine that additional sounds that do not correspond to the voice profile of first commentator 101 are contained in the identified audio segment and prevent transmission of the identified audio into the media asset based on the received selection to avoid the sound of the second commentator 110. In some embodiments, the server transmits instructions to the consumption device 102 to prevents transmission by, for example, muting a speaker of consumption device 102 for a predetermined period of time, such as five seconds. After the predetermined period of time, the system via the server 103 may determine if voice signals that do not match user profile 106 are still present. If so, the system may cause the consumption device 102 to wait for additional time. If not, consumption device 102 may allow audio segments of voice signals to be transmitted into the presentation of the media asset again. For example, first commentator 101 speaks for five seconds. The corresponding voice signal is transmitted into the media asset. The second commentator 110 then speaks for ten seconds. Recognizing that the voice of second commentator 110 does not match the voice profile of first commentator 101, the system may cause the consumption device 102 to prevent transmission of identified audio segments or mutes the speakers of the consumption device 102 for the predetermined period of five seconds. After five seconds, system via the server 103 may again determine that a voice other than that of first commentator 101 is speaking and again prevents transmission of identified audio segments or mutes a speaker on the consumption device 102, for an additional five seconds.

Another method of filtering unwanted sounds may be accomplished by transcribing a voice signal into corresponding text at the server. The server 103 may transcribe voice signal 104 into corresponding text or closed captions when not already available for the media asset. Using natural language processing, server 103 may determine a language usage level. The server may compare the language usage level with profile list 108. Based on the context of the media asset, consumption device 102 may determine which audio segments of the transcribed text should be transmitted into the media asset and which should be muted. For example, if the media asset is a news report, text spoken by the first speaker may be transmitted, while if the media asset is a weather report, text spoken by the second speaker may be not transmitted. Alternatively or additionally, consumption device 102 may determine the subject matter of each audio segment of the text. Based on preferences to avoid scary stories, crime stories, or traffic stories, as received in a selection from the user at the consumption device 102, profile list 108 may also include subject-matter data as well as actions to perform when the particular voice profile is identified. For example, the user may have saved a control action for some subject matter or people to decrease the volume a specific amount or convert the sound to text and present it as subtitles, or mute the person altogether. If the subject of the text matches a subject of the media asset, that audio segment of the text is allowed to be transmitted to the consumption device.

Figure 2:
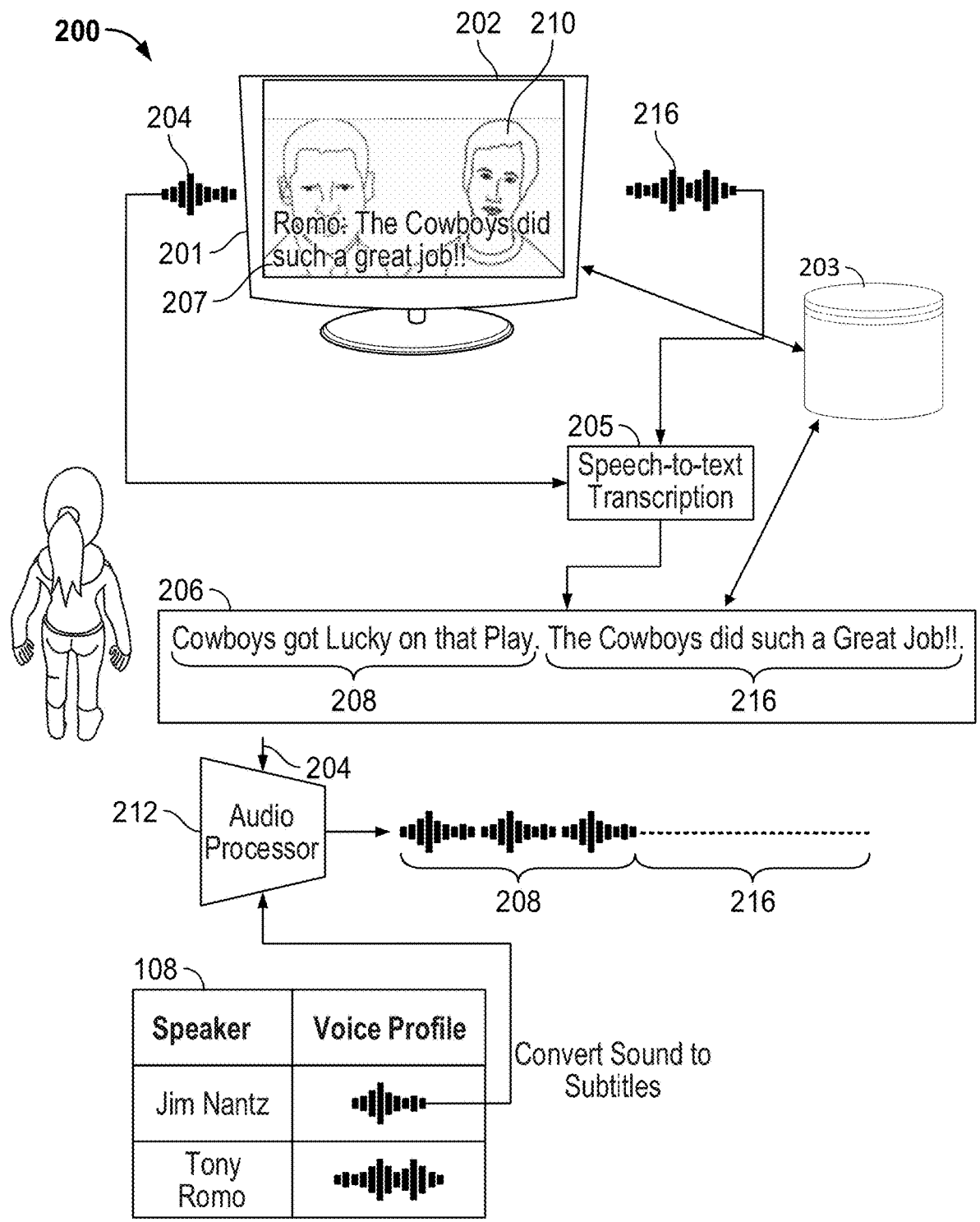
FIG. 2 shows an exemplary scenario in which transcribed text of a voice signal is synthesized in the voice of a speaker, in accordance with some embodiments of the disclosure.

FIG. 2 shows an exemplary scenario in which transcribed text of a voice signal is synthesized in the voice of a person, in accordance with some embodiments of the disclosure. To transmit the text into the media asset, the server 103 may retrieve a voice profile of the speaker that spoke the portion of the text. Using the voice profile, server 103 may synthesize the voice of that person into a second voice signal. Methods of synthesizing a voice are described in commonly assigned U.S. patent application Ser. No. 15/931,074, entitled "Systems and Methods for Generating Synthesized Speech Responses to Voice Inputs," filed May 13, 2020, which is hereby incorporated herein by reference in its entirety. Based on receiving a selection of what the user wants to hear and what the user does not want to hear, the server 103 may transmit the second voice signal into the media asset for the presentation on the consumption device 102. In some embodiments, the transcribed text/closed caption may be transmitted by consumption device 102 and synthesized in the voice of a third speaker by a server associated with the media asset or by participating consumption devices.

The server 103, or the consumption device 102 may, simultaneously or in sequence, identify voice signal 204 and voice signal 216. Voice signal 204 may represent the speech of the first commentator 201 and voice signal 216 may represent the speech of second commentator 210. For example, first commentator 201 may be commenting on a football game and may say, "Cowboys got lucky on that play." The second commentator 210 may, simultaneously with first character 201, or right before or right after first commentator 201 speaks, say, "The Cowboys did such a great job!!" The server 103 or the consumption device 202, using speech-to-text transcription engine 205, transcribes the combined voice signal (e.g., audio stream of the media asset) into corresponding text 206 and, using natural language processing, determines whether an audio segment of the text was spoken by a first person and another audio segment of the text was spoken by a second person. In some embodiments, the manifest file for the media asset may contain a closed caption file or a reference to a closed caption file (side-care file) including the source of the sounds/audio, for example, who is speaking at any time during the media asset. Each audio segment corresponding to text/closed caption may be analyzed separately to determine which audio segment should be transmitted to the consumption device for the presentation of the media asset based on the received selection at the consumption device. For example, server 203 may identify text (closed caption) 208 corresponding to the speech of first commentator 201 and text (closed caption) 216 corresponding to the speech of second commentator 210. The audio segment may be identified based on contexts, such as the subject matter of each segment, language usage level of each segment, or voice characteristics of each segment. Server 203 may determine that audio segment 208 was spoken by first commentator 201 and/or is relevant to the media asset that the server 203 is permitted to transmit into the consumption device 202. For example, the subject matter of each audio segment transcribed to text may be compared to a user profile listing of subjects with whom each respective speaker is familiar. If the subject matter of an audio segment matches the list of subjects for a particular person, that person may be identified as the speaker of that audio segment. For example, in a sports commentary, one commentator is generally a play-by-play commentator, and one commentator is generally an expert-opinion commentator. Consumption device 202 receives the media asset, which includes the video stream, the audio stream and the metadata associated with the media asset. In some embodiments, the media asset is received in the form of a manifest file including video playlist, audio playlist, and closed caption playlist. Each of the playlists are synchronized to generate for display a seamless presentation of the media assed. In some embodiments, the media asset also includes subtitles that indicate the speaker or source of the sound. Audio processor 212, which may be part of consumption device 202, or located at a remote server and uses the received media asset, including the audio stream, to identify voice profiles of the speakers in the audio stream. For example, the audio segment includes a voice of a first speaker 201 to synthesize text portion 208 in the voice of the first speaker 201. The resulting voice signal 214, including the audio segment 208 corresponding to the text of the first speaker 201, and the audio segment 216 corresponding to the second speaker 210, are then transmitted into the presentation of the media asset. Second audio segment 216, which corresponds to the second speaker 210, which the consumption device received instructions to avoid, is not synthesized into a voice signal, but rather is inserted as subtitle 207 into the presentation of the media asset. For example, when the second commentator is the speaker, the consumption device converts the audio of the second commentator to text and automatically presents on display during the presentation of the media asset.

In some cases, the subject matter of each segment may be compared with the subject matter of the media asset to determine whether each portion is relevant to the media asset. For example, in some cases, the commentators are reading a live commercial for a product that is not related to the football game. The system may determine that an audio segment in which the commentators (e.g., first speaker and second speaker) are speaking has a subject matter that is different from the football game, and as a result it may mute the audio segment of both commentators. For example, in some cases, more than one speaker may speak during the presentation of a media asset. If the audio segments of text spoken by each speaker are determined to be relevant to the media asset (based on subject, etc.), each audio segment of text may be separately synthesized into a voice signal using a respective voice profile of each speaker. The voice signals are then separately transmitted into the media asset.

Figure 3:
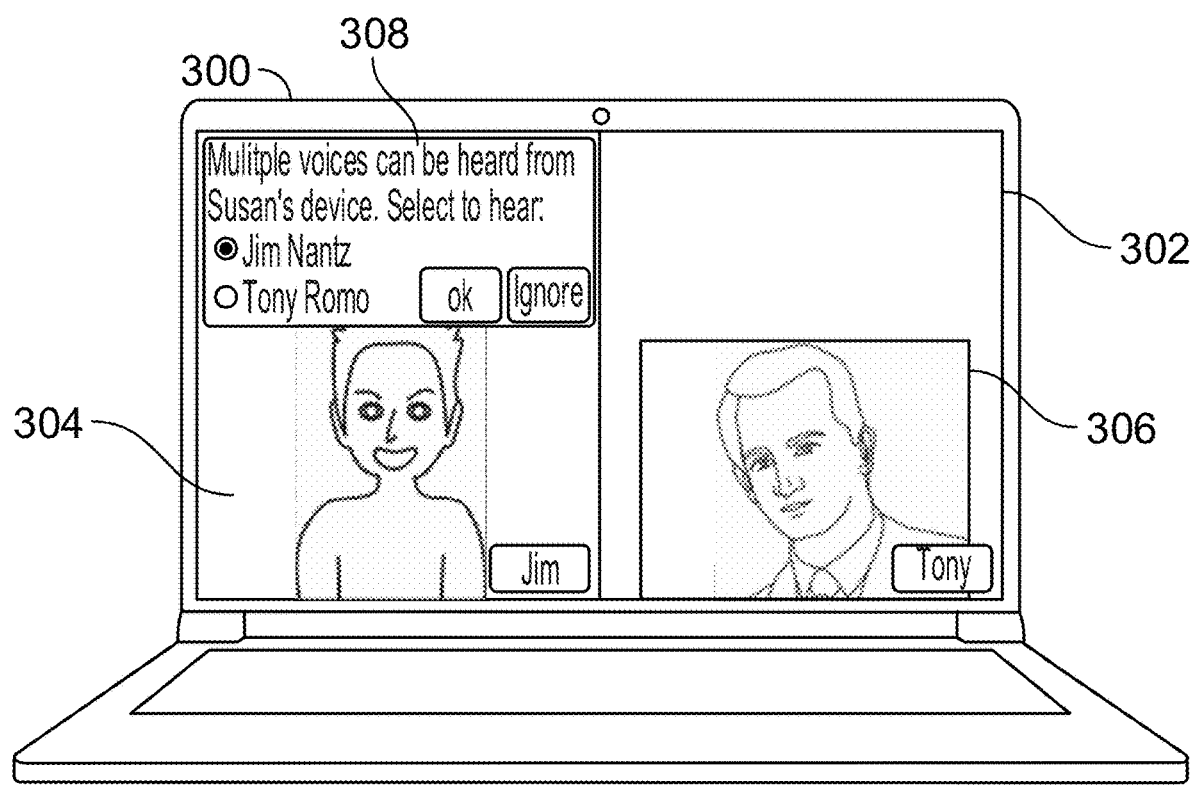
FIG. 3 shows an exemplary consumption device display and user interface element allowing a user to select to which of a plurality of voice signals being presented on a consumption device from a media asset the user would like to listen, in accordance with some embodiments of the disclosure.

FIG. 3 shows an exemplary consumption device display and user interface element allowing a user to select to which of a plurality of voice signals being presented on a consumption device from a media asset the user would like to listen, in accordance with some embodiments of the disclosure. Consumption device 300 displays commentators 304 and 306 for a football game on display 302. For example, commentator Jim is displayed in portion 304 and commentator Tony is displayed in portion 306. If multiple voices are detected in an audio stream for the user of media device 300, Susan, dialog box 308 may be displayed. Dialog box 308 offers Susan an option to select which voice in the audio stream she wants to hear. Consumption device 300 may process the audio stream to transcribe and synthesize the portions of the audio stream from commentator Jim to generate a voice signal for the selected voice. Alternatively, a remote server may perform the transcription and speech synthesis, or the media device used by Jim may perform these functions and separately transmit each voice signal into the media asset. As another alternative, the remote server may only transmit text to the consumption device, and the consumption device then performs the speech synthesis functions. This reduces the bandwidth needed for the media asset.

Figure 4:
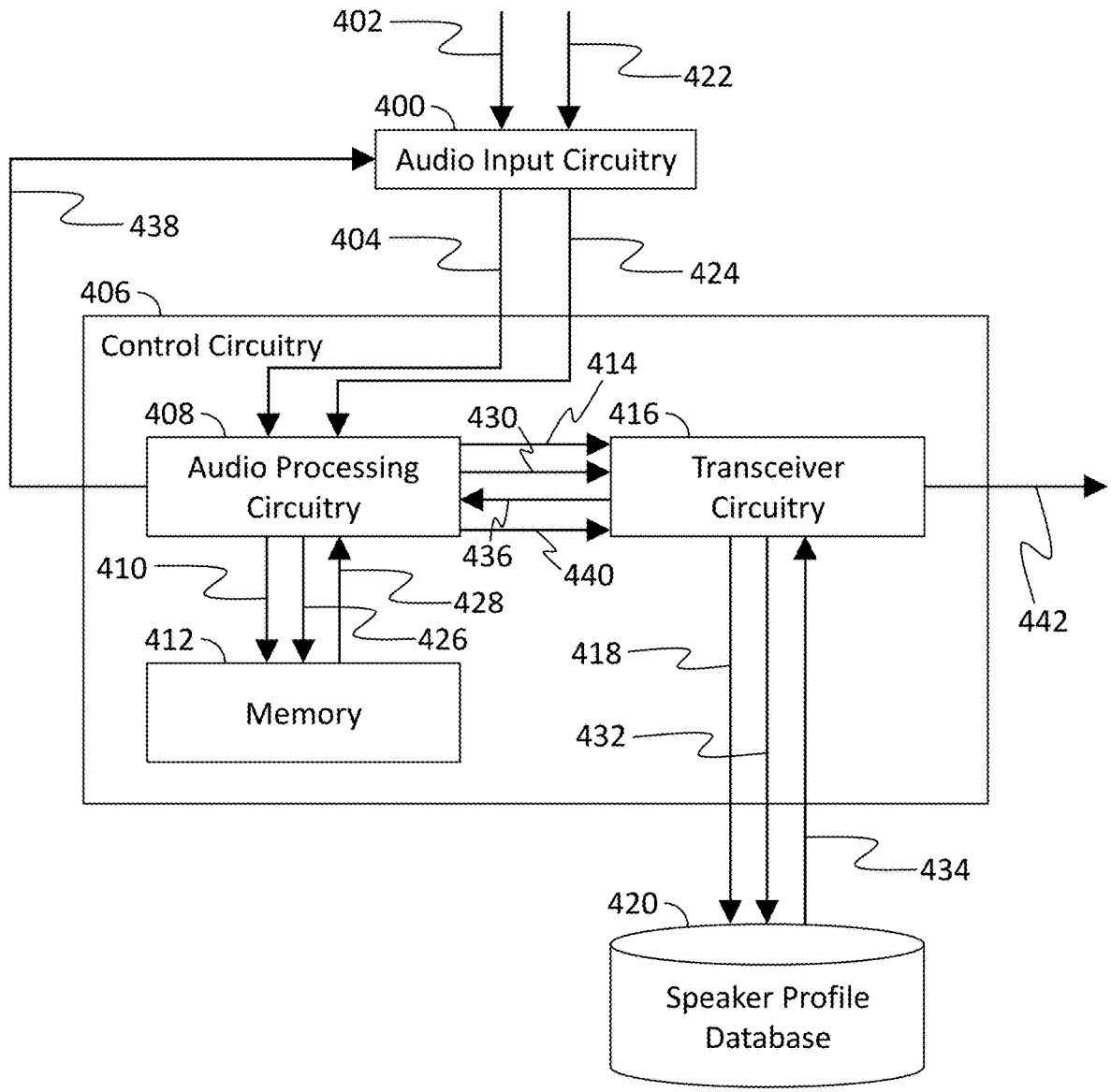
FIG. 4 is a block diagram showing components and data flow therebetween of a system for filtering unwanted sounds from a media asset, in accordance with some embodiments of the disclosure.

FIG. 4 is a block diagram showing components and data flow therebetween of a system for filtering unwanted sounds from a media asset, in accordance with some embodiments of the disclosure. The consumption device receives a media asset. The media asset may include the audio input circuitry 400 to process the audio stream of the media asset to identify first audio segment 402 during the presentation of the media asset. Audio input circuitry 400 may be part of a consumption device on which the system of the present disclosure is implemented, or may be a separate device, or any other device capable of identifying and relaying audio segments from the audio stream input to a consumption device. Audio input circuitry 400 may be a data interface such as a Bluetooth module, WiFi module, or other suitable data interface through which data entered on another device or audio data transmitted by another device can be received at the consumption device. Audio input circuitry 400 may convert the audio streams into audio segments, each being associated with a different sound or person, for example, with a cheering crowd or a commentator, to a digital format such as WAV. Audio input circuitry 400 transmits 404 the first voice signal identified to control circuitry 406. Control circuitry 406 may be based on any suitable processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The first voice signal is received by audio processing circuitry 408. Audio processing circuitry 408 may be any suitable circuitry configured to perform audio analysis functions, such as frequency domain analysis, level and gain analysis, harmonic distortion analysis, etc. Audio processing circuitry 408 analyzes the first voice signal to identify a base frequency of the voice represented by the first voice signal, as well as other voice characteristics such as pitch, intensity, voice quality, intonation, accent, loudness, and rate. Audio processing circuitry 408 transmits 410 the base frequency and voice characteristics to memory 412 for storage in a voice profile associated with the user. In some embodiments, voice profiles are stored remotely. Audio processing circuitry 408 may therefore transmit 414 the base frequency and voice characteristics to transceiver circuitry 416. Transceiver circuitry 416 may be a network connection such as an Ethernet port, WiFi module, or any other data connection suitable for communicating with a remote server. Transceiver circuitry 416 then transmits 418 the base frequency and voice characteristics to the speaker profile database 420.

During or before the presentation of the media asset on the consumption device, audio input circuitry 400 identifies a second voice signal 422. The second voice signal 422 may be a voice signal attributed to a second speaker on display in the media asset based on being different from the first voice signal, or it may be saved in a database as previously identified. Audio input circuitry 400 transmits the second voice signal 424 to control circuitry 406, where audio processing circuitry 408 receives and analyzes the second voice signal. Audio processing circuitry 408 requests 426 the voice profile of the second speaker (if one is available) from memory 412 and receives 428, in response to the request, the voice profile of the second speaker. In some embodiments, where the voice profile is stored in a remote database, audio processing circuitry 408 transmits 430 the request to transceiver circuitry 416, which in turn transmits 432 the request to the speaker profile database 420. In response, transceiver circuitry 416 receives 434 the requested voice profile of the second speaker and in turn transmits 436 the voice profile of the second speaker to audio processing circuitry 408.

Once the voice profile of the second speaker has been identified, audio processing circuitry 408 compares the base frequency and voice characteristics of the voice represented by the second voice signal to the voice profile of the second person. If the base frequency and voice characteristics of the second voice signal do not match the voice profile of the second person, audio processing circuitry 408 creates a new entry with the new person. Based on receiving a selection of which content the user wants to listen to and which audio content is unwanted by the user, the control circuitry 408 prevents transmission of the second voice signal into the media asset. For example, audio processing circuitry 408 may transmit 438 a signal to audio input circuitry 400 to mute a speaker of the consumption device. In some examples, the audio processing circuitry 408 may transmit instructions to the server to stop transmitting second voice signal 424. In some embodiments, the control circuitry transmits instructions to send a blank audio file to replace the audio segment attributed to the second voice signal 424 to avoid causing errors in the presentation of the media asset. In some embodiments, the consumer device relies on metadata inserted at the encoder to automatically and selectively mute/unmute audio segments of the media asset. In another embodiment, the audio segment is intentionally omitted from being included in the manifest file that consumption device receives (e.g., during a live streaming session, the consumption device constantly receives updated manifest files). In yet another embodiment, the audio segment associated with a specific individual (e.g., commentator) or sound (e.g., background, crowd) and sent to the consumption device is blank. In some embodiments, the control circuitry 406 stops or mutes or adjusts the output characteristics of the second audio input circuitry 400 for a predetermined period of time, such as five seconds. Alternatively, the signal may cause audio input circuitry 400 to stop transmitting audio data to control circuitry 406 for the predetermined period of time. The signal may be a manifest file, which may require the transmission of a second manifest file at the end of the predetermined period of time to reenable audio input circuitry 400. Alternatively, the signal may be a voltage level that remains constant at the signaling voltage level during the predetermined period of time, after which the level changes. At the end of the predetermined period of time, a first voice signal may be received.

In another embodiment, the manifest file is manipulated so that any audio segments associated with an undesired/unwanted speaker or sound are not be loaded by the client consumer device (e.g., via the use of EXT-X-GAP/EXT-X-DISCONTINUITY tag in HTTP Live Streaming (HLS)). EXT-X-GAP/EXT-X-DISCONTINUITY tags or a comparative tag are an indication that media data associated transmitted to the consumer device with the URI should not be loaded by clients. In some embodiments, once an audio segment is identified, then a unique voice profile is generated for that specific entity (e.g., one of the commentators is Tony Romo and a voice profile is created for Tony Romo). The selection of which audio that is associated with a character or entity can then be based on the use of voice profiles. For example, additional information can be signaled to the video player to indicate that the audio between 03:47:57 and 4:05:02 is associated with commentator A (Tony Romo). Additionally, the same information can be used by the manifest generation service (e.g., during a live broadcast) to determine which segments to exclude or tag as "do not load" as described earlier. Similarly, a mix of the described techniques can be used based on the genre (e.g., news report, live sports broadcast) or complexity of the content. As part of the manifest file transmitted to the consumer device for the media asset, the audio segment may be marked as 'do not load' for the speakers, characters, or sounds that the user has instructed not to receive. In some embodiments, the audio segment may not be sent to the consumption device in which case a 'discontinuity' (e.g., EXT-X-DISCONTINUITY) is marked in the manifest file or playlist in order to indicate to the consumption device that the audio segment is missing. The manifest file may be a playlist of audio and video segments for the media asset.

In some embodiments, an ingest service could also receive mixed MPEG transport stream MPEG-TS files—i.e., files that contain video (e.g., H.264 or H.265) as well as compressed audio (e.g., Advanced Audio Coding (AAC)). Depending on the audio segment or length of the audio segment, the transport stream (TS) file might not need any manipulation since undesired audio segment may not be present (e.g., there's no audio associated the commentator that the user wishes to mute). To the extent there's any undesired audio segment is in the TS file, then the audio segment can be extracted so that the necessary voice profile processing can take place (e.g., removing the undesired audio segment), and then resynching the processed audio segment to the video. Similarly, such processing can occur before encoding/mixing the audio/video and in such case, there might be no need to separate the audio from the video and then perform a resync. In another embodiment, the MPEG-TS that includes undesired/unwanted audio segment (e.g., person speaking that the viewer does not wish to hear) is further segmented at the next available I-frame, and the undesired/unwanted audio segment (e.g., all audio data associated with the segment) is then extracted to produce a segment with just video. In yet another embodiment, a dedicated cloud-based audio signal processing service can use pre-exiting/trained models—for example, convolutional neural networks (CNN) to separate the various audio signals (e.g., background music from people talking in a movie scene, etc.). For example, a deep learning model can be trained from pre-existing recorded content (i.e., classified dataset) with sounds that are classified (e.g., piano, crowds cheering, bombing, police sirens, guitar, piano, etc.). Separation and on-the-fly classification of the audio signals within an audio segment enables a granular control over which audio signals/sources to remove, mute, etc.

If the second voice signal does match the voice profile of the first person (i.e., a person who is permitted to speak during the media asset, as received a selection), or if any subsequent voice signal received after the transmission was prevented for the predetermined period of time, audio processing circuitry 408 transmits 440 the appropriate voice signal to transceiver circuitry 416. Transceiver circuitry 416, in turn, transmits 442 the voice signal into the media asset.

Figure 5:
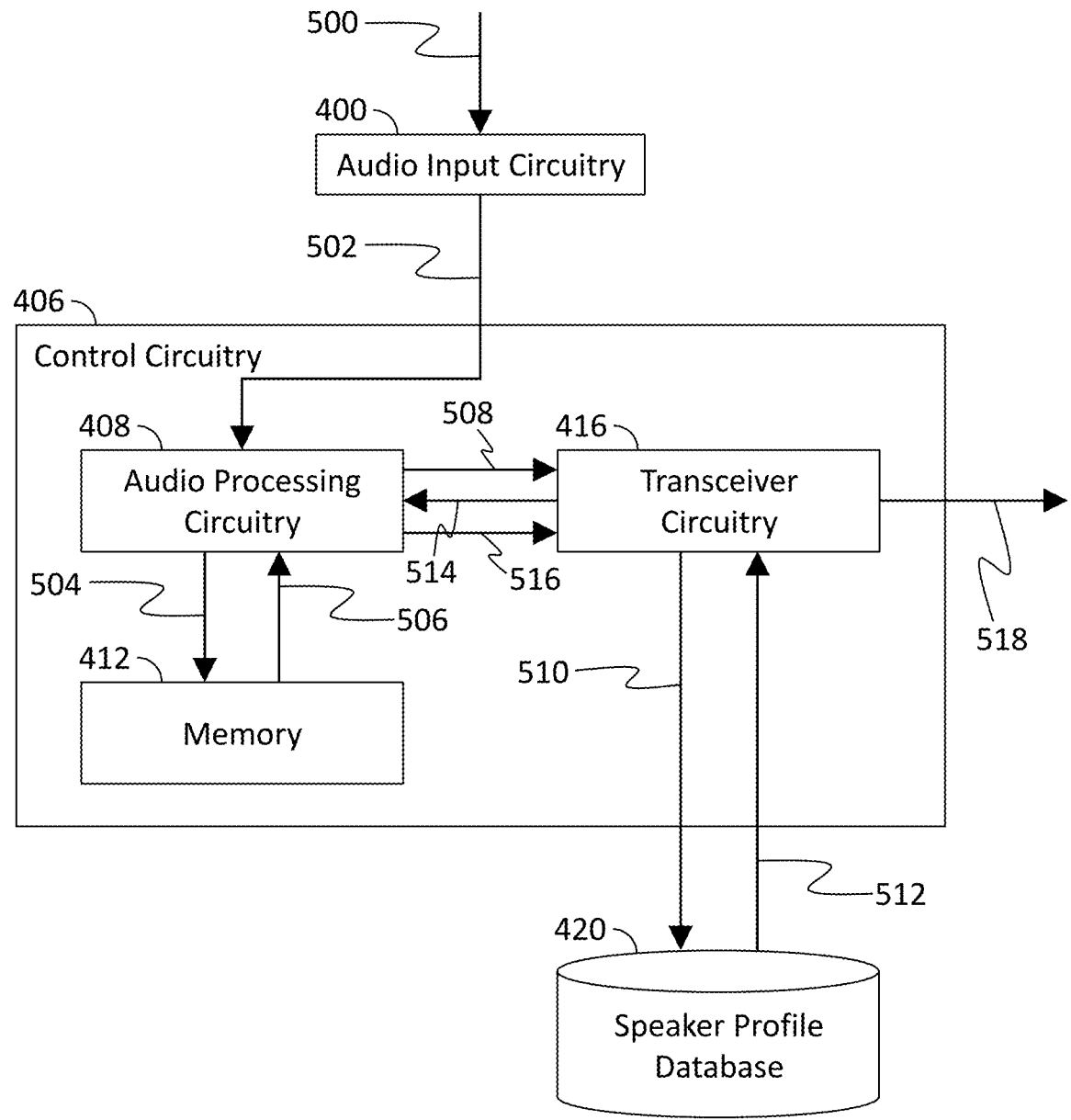
FIG. 5 is a block diagram showing components and data flow therebetween of a system for filtering unwanted sounds from a media asset using speech synthesis, in accordance with some embodiments of the disclosure.

FIG. 5 is a block diagram showing components and data flow therebetween of a system for filtering unwanted sounds from a media asset using speech synthesis, in accordance with some embodiments of the disclosure. Audio input circuitry 400 receives 500 an audio stream associated with a media asset. Audio input circuitry 400 transmits 502 the audio stream to control circuitry 406, where it is received by audio processing circuitry 408. Audio processing circuitry 408 may include natural language processing circuitry. Audio processing circuitry 408 transcribes the audio stream into audio segments each being associated with a different speaker or sound from the presentation and the corresponding text and, using the natural language processing circuitry, identifies a subject matter of the text. Audio processing circuitry 408 then requests 504 and receives 506 a profile of the speaker from memory 412 that includes a list of subjects with which the user is familiar. If speaker profiles are stored remotely, audio processing circuitry 408 may transmit 508 the request for the speaker profile to transceiver circuitry 416, which in turn transmits 510 the request to speaker profile database 420. Transceiver circuitry 416 then receives 512, in response to the request, the speaker profile and in turn transmits 514 the speaker profile to audio processing circuitry 408. Audio processing circuitry 408 compares the subject matter of the text with the list of subjects with which the speaker is familiar. If the subject of the text matches a subject on the list, then audio processing circuitry 408 uses the voice profile of the speaker to synthesize a voice signal in the speaker's voice corresponding to the transcribed text. The synthesized voice signal is then transmitted 516 to transceiver circuitry 416 for transmission 518 into the consumption device presenting the media asset.

Figure 6:
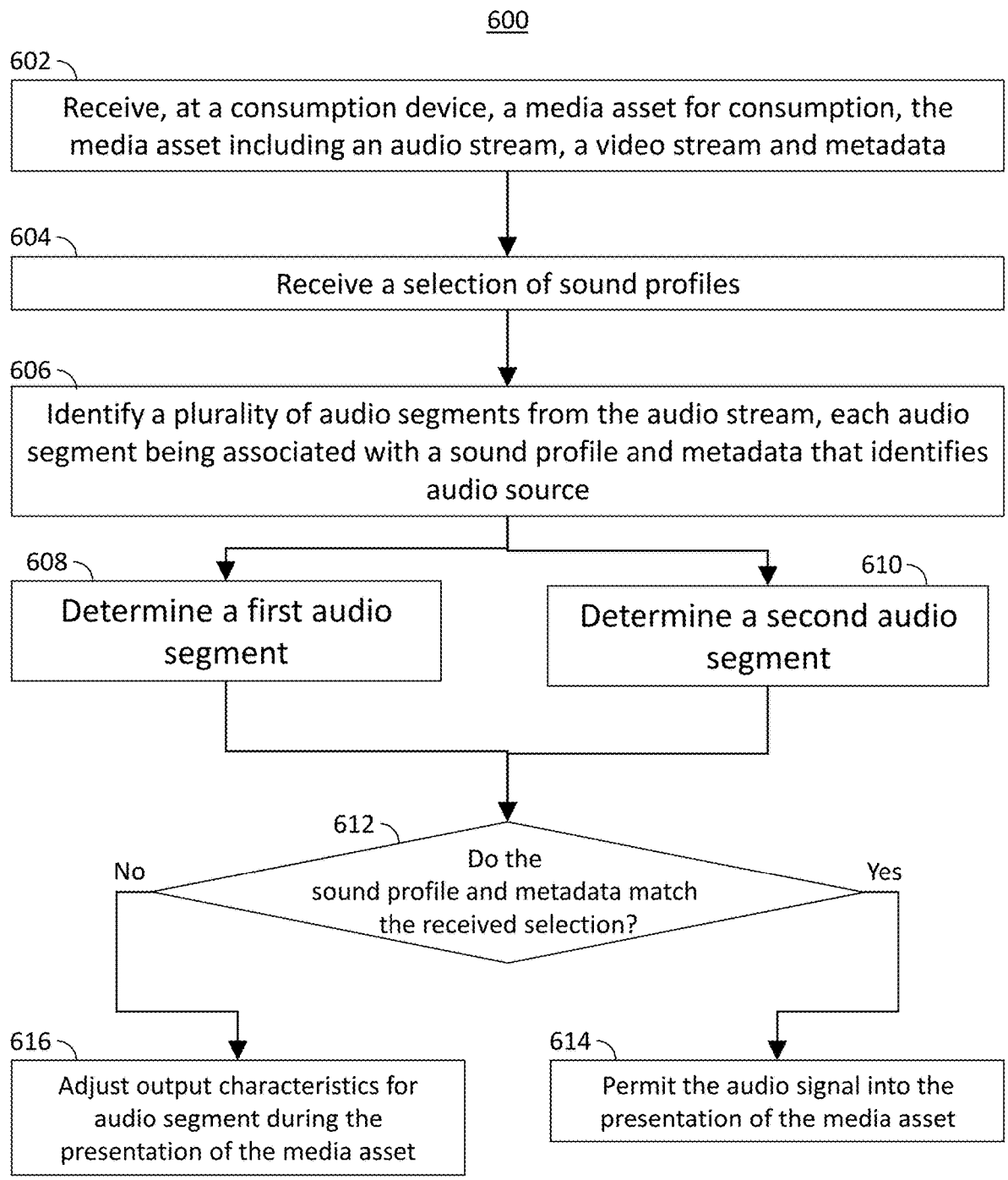
FIG. 6 is a flowchart representing a process for filtering unwanted sounds from a media asset, in accordance with some embodiments of the disclosure.

FIG. 6 is a flowchart representing an illustrative process 600 for filtering unwanted sounds from a media asset, in accordance with some embodiments of the disclosure. Process 600 may be implemented on control circuitry 406. In addition, one or more actions of process 600 may be incorporated into or combined with one or more actions of any other process or embodiment described herein.

At 602, control circuitry 406 receives, at a consumption device, a media asset for consumption. The media asset includes a manifest file with a playlist of an audio stream, a playlist of a video stream and metadata. The audio stream may be processed to identify different sounds on the audio stream. For example, the audio stream may be segmented into different audio segments, each being associated with a different sound or speaker.

At 604, control circuitry 406 of the consumption device may receive a selection for sound profiles during the presentation of the media asset on the consumption device. The selection may be to receive only certain sounds or to avoid certain sounds. In some cases, the consumption device may receive a selection to avoid a certain commentator, a certain part of the presentation or a certain subject.

At 606, control circuitry 406 identifies a plurality of audio segments from the audio stream. Each audio segment is associated with a sound profile and metadata that identifies the audio source, for example, Tony Romo or Jim Nantz as the commentators. A first voice signal may be identified by a processor of the consumption device or may be identified by another device with which audio input circuitry 400 communicates or may be identified by the metadata transmitted with the file or may be identified by the subtitles of the sounds. In some embodiments, the first voice signal is analyzed by audio processing circuitry 408 to identify audio and voice characteristics of the first voice signal. The identified characteristics are stored in the voice profile of the speaker. By identifying the first voice signal in the audio stream, the control circuitry 406 may process the audio stream into smaller audio segments during which only the identified voice signal is heard. For example, control circuitry 406 compares the base frequency, pitch, intensity, voice quality, intonation, and accent of the first voice signal with the base frequency, pitch, intensity, voice quality, intonation, and accent stored in the second voice signal to differentiate the sounds. In some embodiments, start time and duration are identified for each audio segment. Based on the identified start time and duration, the control circuitry 406 may receive instructions to play only certain audio segments (i.e., audio segments the user has selected) where the voice signal is heard. In some embodiments, the audio segment being presented to an audio processing circuitry 408 analyzes whether a second voice signal is identified by the consumption device during a presentation of the media asset. Based on a different voice/sound, the control circuitry 406 may attribute the sound to a second voice profile and partition or splice the audio stream based on the second audio segment.

At 608 and 610, control circuitry 406 may identify the first audio segment and the second audio segment. The control circuitry 406 may perform these steps in tandem, in series or in any order, or based on the chronological order in the audio stream. For example, a user profile includes a voice signal profile for a second speaker, and upon that person speaking, the control circuitry identifies the audio segment (i.e., when the second person is speaking). The control circuitry determines that the first voice profile is attributed to a first audio segment.

At 612, the control circuitry 406 compares the first voice signal to the voice profile received at 604. The control circuitry 406 determines that the voice/sound profile of the first audio segment and the received selection of permitted voice profiles match. If the sounds match ("YES" at 612), then, at 614, the control circuitry 406 permits the presentation of the audio segment during the presentation of the media asset on the consumption device. The audio segment is synchronized with its original placement along the video stream of the media asset. The control circuitry determines for each audio segment identified in the audio stream whether the audio segment contains the received selection of permitted voice profiles. On the other hand, when the audio segment contains voice signals that are not on the received selection of permitted audio profiles ("No" at 612), then, at 616, the control circuitry 406 adjusts the output characteristics for the respective audio segments. For example, if the base frequency, pitch, intensity, voice quality, intonation, and accent of the second voice signal do not match the voice profile of the speaker (as received), then the second voice signal is determined to include a voice other than the voice of the first speaker. In some embodiments, the control circuitry 406 mutes the volume of the audio segment during the presentation of the media asset. In some embodiments, if the second voice signal includes the voice of a second person, and such person has been indicated to avoid ("No" at 612), then, at 616, control circuitry 406 prevents the second voice signal from being transmitted into the media asset. For example, control circuitry 406 may send a signal to audio input circuitry 400 to prevent the transmission or adjust the output characteristics (e.g., volume) of voice signals or the transmission of voice signals to control circuitry 406 for a predetermined period of time, such as five seconds. Alternatively, control circuitry 406 may prevent audio processing circuitry 408 from transmitting voice signals into the media asset via transceiver circuitry 416.

The actions and descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
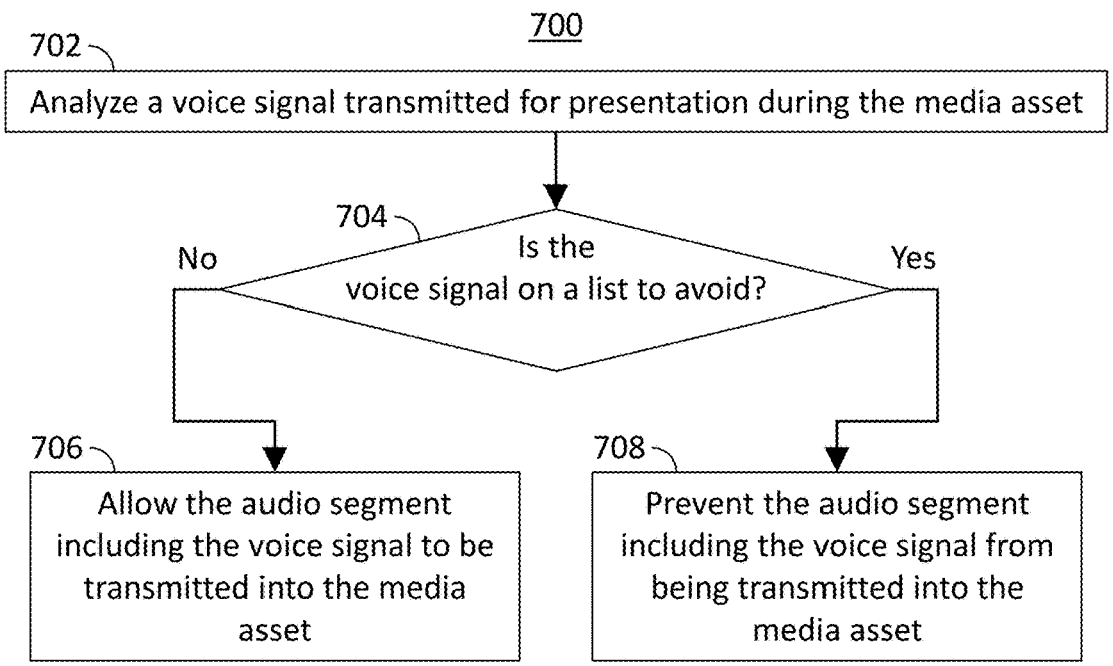
FIG. 7 is a flowchart representing a process for allowing transmission of an audio segment into a media asset after detecting an unwanted sound, in accordance with some embodiments of the disclosure.

FIG. 7 is a flowchart representing an illustrative process 700 for allowing transmission of audio into a consumption device after detecting an unwanted sound, in accordance with some embodiments of the disclosure. Process 700 may be implemented on control circuitry 406. In addition, one or more actions of process 700 may be incorporated into or combined with one or more actions of any other process or embodiment described herein.

At 702, control circuitry 406, using audio processing circuitry 408, analyzes a voice signal transmitted for presentation during the media asset. This may be a similar analysis to that described above in connection with FIG. 6. At 704, control circuitry 406 determines whether the voice signal is on a list of voice signals to avoid. If not ("No" at 704), then, at 706, control circuitry 406 allows the audio segment including the voice signal to be transmitted into the media asset. If the voice signal is on the list of voice signals to avoid ("Yes" at 704), then, at 708, control circuitry 406 prevents the audio segment including the voice signal from being transmitted into the media asset. This may be accomplished using the methods described above in connections with FIGS. 4 and 6. The list to avoid may be received from the user of the consumption device or gathered throughout many uses. The list extends beyond the speaker and to topics or subjects or events. For example, the user may want to avoid weather reports while watching the nightly news report. Based on the voice signal being directed to weather, the control circuitry may prevent the sound from being transmitted. Similarly, the user may prefer to avoid traffic reports or entertainment reports on a radio station. In some embodiments, the user may choose to focus on the foreground noise and may want to limit or avoid the background noise of a stadium cheering on a home team altogether.

The actions and descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
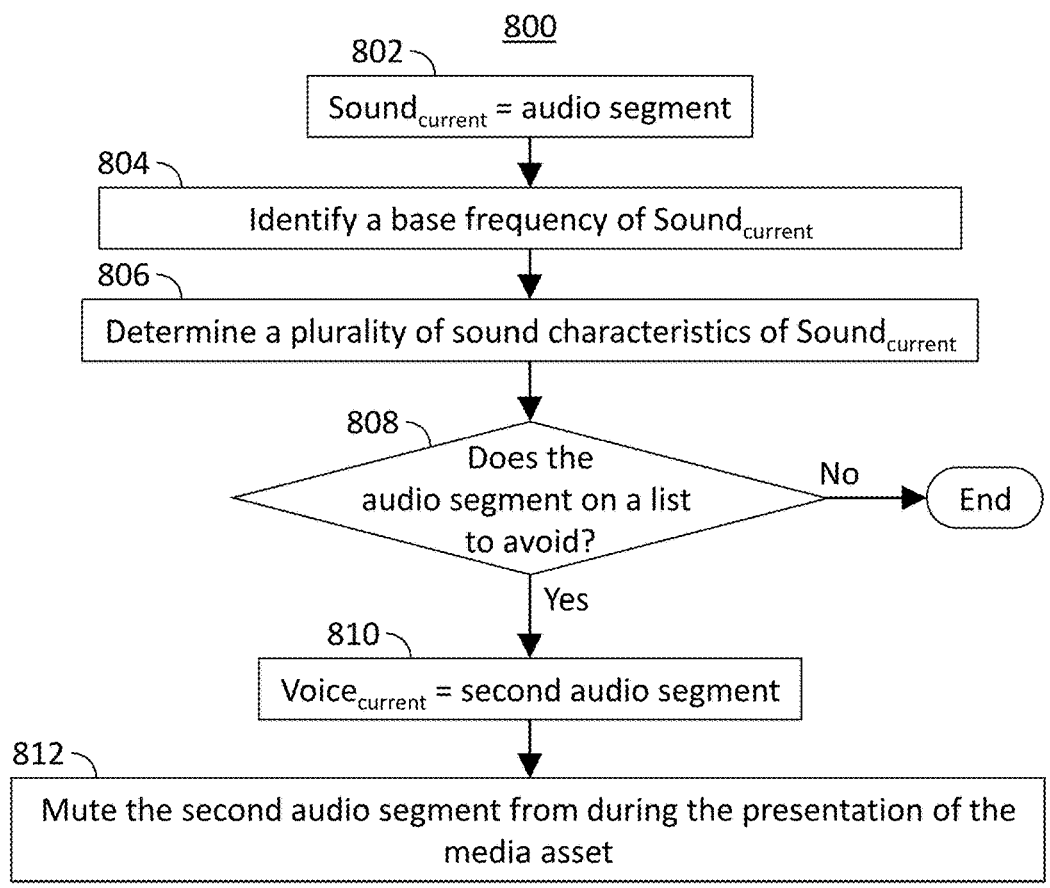
FIG. 8 is a flowchart representing a process for generating a voice profile of a speaker in the media asset, in accordance with some embodiments of the disclosure.

FIG. 8 is a flowchart representing an illustrative process 800 for generating a voice profile of a user, in accordance with some embodiments of the disclosure. Process 800 may be implemented on control circuitry 406. In addition, one or more actions of process 800 may be incorporated into or combined with one or more actions of any other process or embodiment described herein.

At 802, control circuitry assigns a first identified sound, as part of an audio segment from an audio stream of the media asset to the variable $Sound_{current}$. At 804, control circuitry 406, using audio processing circuitry 408, identifies a base frequency of $Voice_{current}$. For example, control circuitry 406 may analyze a frequency spectrum of $Voice_{current}$ to determine a primary harmonic frequency of the voice. At 806, control circuitry 406 determines a plurality of voice characteristics, such as pitch, intensity, voice quality, intonation, accent, loudness, and rate. For example, control circuitry 406 may compare vowel sounds spoken in $Voice_{current}$ with a set of known accents to determine an accent with which the speech represented by $Voice_{current}$ was spoken. Audio amplitude may be analyzed to determine loudness. Patterns of changes in loudness and frequency may be used to determine an intonation.

At 808, control circuitry 406 determines whether the audio segment includes the first voice signal on a list to avoid. For example, control circuitry 406 may determine if based on the multiple base frequencies that are present or if words are spoken at different speeds, the voice signal is on a list of sound profiles to avoid. If so ("Yes" at 808), then, at 810, control circuitry 406 assigns the voice signal as a second audio segment to $Voice_{current}$, and the analysis described above is performed for the second audio segment. If not ("No" at 808), then the process ends. In this case, the voice signal is not on a list of sounds to avoid; accordingly, the sound (e.g., audio segment) is presented during the presentation of the media asset on the consumption device.

The actions and descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
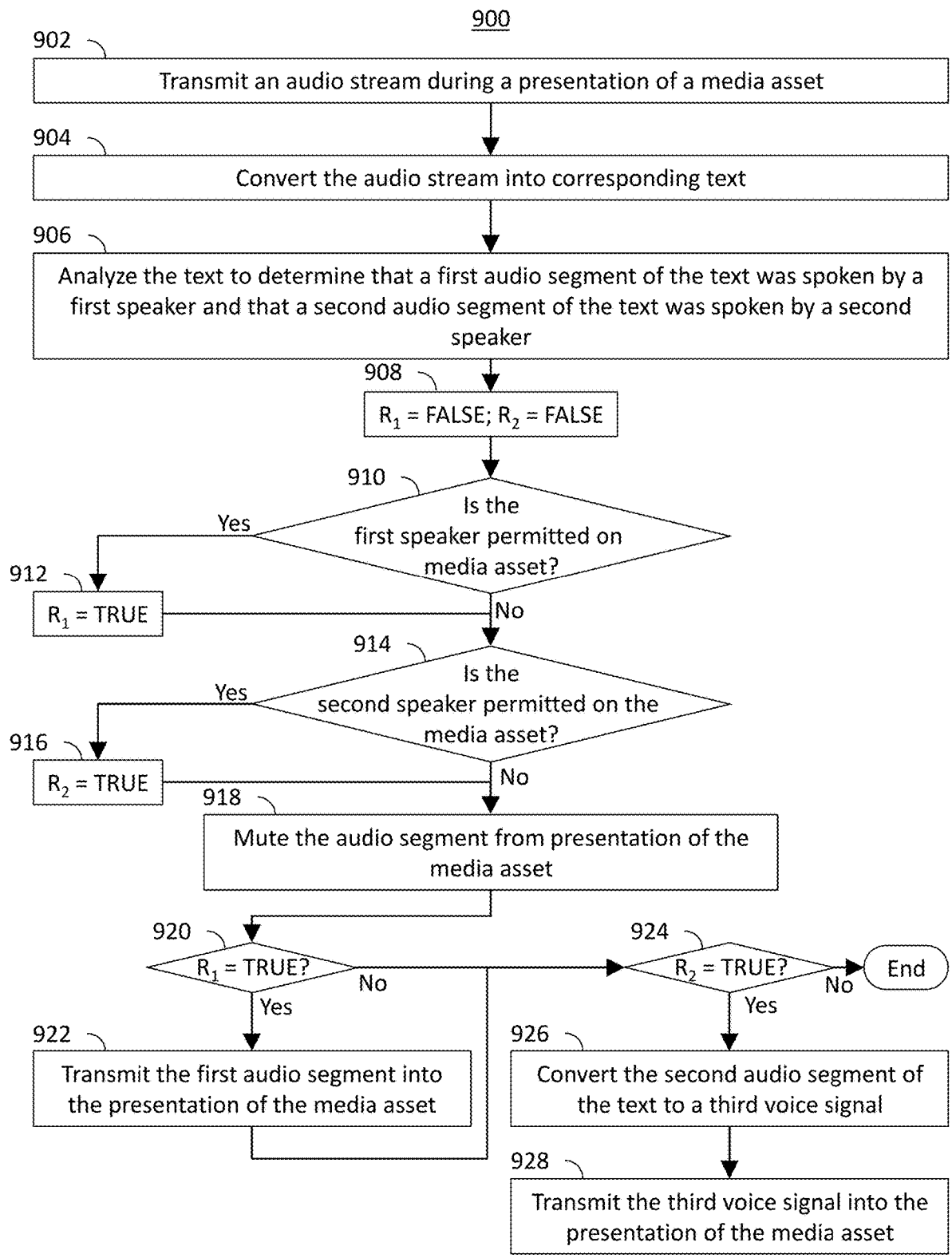
FIG. 9 is a flowchart representing a process for filtering unwanted sounds from a media asset using speech synthesis, in accordance with some embodiments of the disclosure.

FIG. 9 is a flowchart representing an illustrative process 900 for filtering unwanted sounds from a media asset using speech synthesis, in accordance with some embodiments of the disclosure. Process 900 may be implemented on control circuitry 406. In addition, one or more actions of process 900 may be incorporated into or combined with one or more actions of any other process or embodiment described herein.

At 902, control circuitry 406 transmits an audio stream during the presentation of the media asset. At 904, control circuitry 406, using audio processing circuitry 408, converts the audio stream to corresponding text, which may be accomplished using any known speech-to-text technique. In some embodiments, a closed caption file is included with the audio stream and audio does not need to be converted. At 906, control circuitry 406 analyzes the text (e.g., closed caption) to determine that a first audio segment of the text was spoken by a first speaker and that a second audio segment of the text was spoken by a second speaker. In some embodiments, the sounds may be attributed to noise in the media asset, for example, a cheering crowd or explosions. The control circuitry 406, using audio processing circuitry 408, may determine that some words were spoken at a different frequency or with a different rate, accent, intensity, voice quality, intonation, or pitch. Alternatively or additionally, using natural language processing functions of audio processing circuitry 408, control circuitry 406 may identify multiple language usage levels or multiple subjects within the text.

At 908, control circuitry 406 initializes a first Boolean variable $R_1$, setting its value to FALSE, and a second Boolean variable $R_2$, also setting its value to FALSE. At 910, control circuitry 406 determines whether the first speaker and, in particular, the content of the audio segment attributed to the first speaker are permitted to be presented on the media asset. For example, control circuitry 406 may access data relating to the media asset, such as a football game or metadata of the active teams playing to determine a subject of the media asset. Control circuitry 406 then compares the portion of text spoken by the first speaker with the subject of the media asset. If the portion of the text spoken by the first speaker is determined to be relevant to the media asset or if the portion of the text spoken by the first speaker is determined to be attributed to a speaker who is on a list of permitted speakers, then, at 912, control circuitry 406 sets the value of $R_1$ to TRUE. Otherwise, the value of $R_1$ remains FALSE. In either case, processing proceeds to 914, at which a similar determination is made for the second speaker. If the portion of the text spoken by the second speaker is determined to be relevant to the media asset or if the portion of the text spoken by the first speaker is determined to be attributed to a speaker who is on a list of permitted speakers, then, at 914, control circuitry 406 sets the value of $R_2$ to TRUE. Otherwise, the value of $R_2$ remains FALSE. In either case, processing proceeds to 918.

At 918, control circuitry 406 mutes the audio segment from the presentation of the media asset. For example, control circuitry 406 may instruct audio processing circuitry 408 not to transmit the second audio segment to transceiver circuitry 416. At 922, control circuitry 406 determines whether the $R_1$ is TRUE. If so ("Yes" at 920), then, at 922, control circuitry 406, using audio processing circuitry 408, transmits the first audio segment into the presentation of the media asset. For example, audio processing circuitry 408 retrieves a voice profile of the first speaker and, using known text-to-speech techniques, synthesizes the first audio segment of the text to a corresponding voice signal in the first speaker's voice.

After transmitting the second voice signal into the presentation of the media asset, or if $R_1$ is FALSE ("No" at 920), at 924, control circuitry 406 determines whether $R_2$ is TRUE. If so ("Yes" at 924), then, at 926, control circuitry 406, using audio processing circuitry 408, converts the second portion of the text to a third voice signal. For example, audio processing circuitry 408 retrieves a voice profile of the second user and, using known text-to-speech techniques, synthesizes the second portion of the text to a corresponding voice signal in the voice of the second user. Then, at 928, control circuitry 406 transmits the third voice signal into the media asset. The first and third voice signals may be multiplexed together in a single transmission. If $R_2$ is FALSE ("No" at 924), then the process ends.

The actions and descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
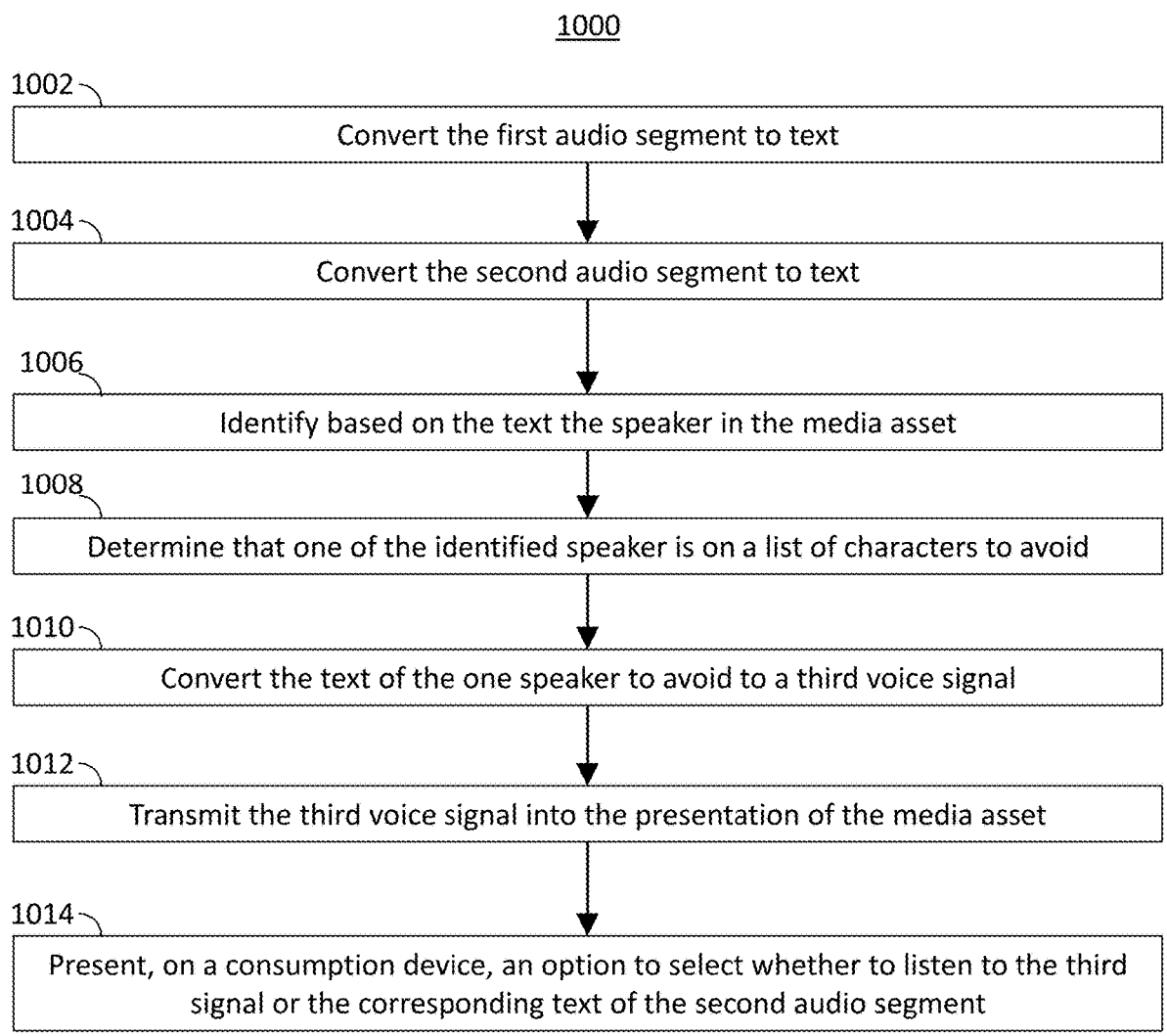
FIG. 10 is a flowchart representing a process for presenting on a consumption device an option to select to listen to a converted audio segment or corresponding text of the unwanted second audio segment, in accordance with some embodiments of the disclosure.

FIG. 10 is a flowchart representing a process 1000 for presenting on a consumption device an option to select to listen to a third audio segment converted from the second audio segment in a different voice or corresponding text of the second audio segment, in accordance with some embodiments of the disclosure. Process 1000 may be implemented on control circuitry 406. In addition, one or more actions of process 1000 may be incorporated into or combined with one or more actions of any other process or embodiment described herein.

At 1002, control circuitry 406 converts the first audio segment of the audio stream from the media asset to text and, at 1404, converts the second audio segment of the audio stream from the media asset to text. These actions may be accomplished using the methods described above in connection with FIG. 9. At 1006, control circuitry 406 identifies based on the converted text of the speaker associated with each segment. For example, the control circuitry that the text converted from the second audio segment is attributed to Tony Romo, while the text converted from the first audio segment is attributed to Jim Nantz. At 1008, control circuitry 406 determines that one of the identified speakers is on a list of speakers to avoid, and, at 1010, converts the text of the one speaker to a third voice signal. For example, a generic sound may be selected, or a specific sound that the user prefers, to convert the text to the audio using a third voice signal. At 1012, control circuitry 406 transmits the third voice signal into the media asset. At 1014, an option is presented on a consumption device to select whether to listen to the third voice signal or view the corresponding text of the second audio segment. For example, the user will receive an option whether be wants to replace the sound with a new sound similar to dubbing or insert the text.

The actions and descriptions of FIG. 10 may be used with any other embodiment of this disclosure. In addition, the actions and descriptions described in relation to FIG. 10 may be done in suitable alternative orders or in parallel to further the purposes of this disclosure.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, webcasts, etc.), a collection of episodes in a series, a single episode in a series, video clips, audio, content information, pictures, rotating images, documents, playlists, websites, articles, books, electronic books, blogs, advertisements, chat sessions, social media, chat rooms, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As referred to herein, the phrase "in response" should be understood to mean automatically, directly and immediately as a result of, without further input from the user, or automatically based on the corresponding action where intervening inputs or actions may occur.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving a media asset comprising an audio stream, the audio stream comprising a plurality of audio segments, wherein each of the plurality of audio segments includes metadata that identifies a corresponding speaker;
   determining, for a first audio segment of the plurality of audio segments, whether the corresponding speaker for the first audio segment matches a user profile comprising at least one speaker to avoid;
   determining, for a second audio segment of the plurality of audio segments, whether the corresponding speaker for the second audio segment matches the user profile comprising the at least one speaker to avoid;
   in response to the determining the corresponding speaker for the first audio segment does not match the user profile comprising the at least one speaker to avoid, outputting the first audio segment with the corresponding speaker; and
   in response to the determining the corresponding speaker for the second audio segment matches the user profile comprising the at least one speaker to avoid, modifying an output characteristic of the second audio segment during one or more time periods when the corresponding speaker for the second audio segment is identified.

2. The method of claim 1, wherein the modifying the output characteristic of the second audio segment comprises:
   converting the second audio segment to a corresponding text; and
   the method further comprises:
   generating for display the corresponding text on a display of a consumption device.

3. The method of claim 2, further comprising:
   converting the corresponding text from the second audio segment to a third audio segment that matches a voice profile belonging to the corresponding speaker for the first audio segment; and
   transmitting the third audio segment into the media asset in place of the second audio segment.

4. The method of claim 1, wherein the modifying the output characteristic of the second audio segment comprises reducing or muting an output volume of the second audio segment.

5. The method of claim 1, further comprising:
receiving the media asset at a consumption device, wherein the receiving the media asset comprises receiving, at the consumption device, live primetime content; and
the method further comprising:
transcribing the audio stream into a corresponding text;
identifying the plurality of audio segments of the corresponding text attributed to sound profiles;
comparing the identified plurality of audio segments with the user profile associated with preferences of sound profiles, wherein the user profile comprises a list of sound profiles a user prefers;
determining, based on the comparing, whether the identified plurality of audio segments matches a sound profile from the list of sound profiles; and
in response to the determining the identified plurality of audio segments does not match the sound profile from the list of sound profiles, presenting the corresponding text to the consumption device.

6. The method of claim 1, further comprising:
identifying the plurality of audio segments from the audio stream, wherein the identifying comprises:
identifying a base frequency of each audio segment of the plurality of audio segments;
determining a plurality of voice characteristics for each respective audio segment; and
storing, in association with each audio segment, the base frequency and the plurality of voice characteristics.

7. The method of claim 6, wherein the plurality of voice characteristics includes at least one characteristic selected from a group consisting of pitch, intonation, accent, loudness, and rate.

8. The method of claim 1, further comprising:
generating a sound profile of each audio segment of the plurality of audio segments, wherein the generating comprises:
transcribing each audio segment into a corresponding text;
processing the corresponding text to determine a sound source;
comparing the sound source with user preferences of a list of sound sources;
determining, based on the comparing, whether the sound source matches the list of sound sources; and
in response to the determining the sound source does not match the list of sound sources, muting each audio segment of the plurality of audio segments whose sound source does not match the list of sound sources.

9. The method of claim 1, further comprising:
transmitting, to a server, preferences associated with the user profile;
searching the plurality of audio segments of the media asset for audio segments that are acceptable to the user profile based on the preferences; and
transmitting, to a consumption device, acceptable audio segments.

10. The method of claim 1, further comprising:
identifying the plurality of audio segments from the audio stream, wherein the identifying comprises:
receiving a closed caption of the media asset;
searching the closed caption of the media asset to identify the corresponding speaker for each audio segment of the plurality of audio segments;
in response to identifying the corresponding speaker for each audio segment of the plurality of audio segments, comparing each identified speaker to a list of permitted speakers; and
in response to the comparing, muting one or more audio segments with identified speakers not on the list of permitted speakers.

11. A system comprising:
audio input circuitry configured to process voice signals; and
control circuitry configured to:
receive a media asset comprising an audio stream, the audio stream comprising a plurality of audio segments, wherein each of the plurality of audio segments includes metadata that identifies a corresponding speaker;
determine, for a first audio segment of the plurality of audio segments, whether the corresponding speaker for the first audio segment matches a user profile comprising at least one speaker to avoid;
determine, for a second audio segment of the plurality of audio segments, whether the corresponding speaker for the second audio segment matches the user profile comprising the at least one speaker to avoid;
in response to determining the corresponding speaker for the first audio segment does not match the user profile comprising the at least one speaker to avoid, output the first audio segment with the corresponding speaker; and
in response to determining the corresponding speaker for the second audio segment matches the user profile comprising the at least one speaker to avoid, modify an output characteristic of the second audio segment during one or more time periods when the corresponding speaker for the second audio segment is identified.

12. The system of claim 11, wherein the control circuitry is configured to modify the output characteristic of the second audio segment by:
converting the second audio segment to a corresponding text; and
the control circuitry is further configured to:
generate for display the corresponding text on a display of a consumption device.

13. The system of claim 12, wherein the control circuitry is further configured to:
convert the corresponding text from the second audio segment to a third audio segment that matches a voice profile belonging to the corresponding speaker for the first audio segment; and
transmit the third audio segment into the media asset in place of the second audio segment.

14. The system of claim 11, wherein the control circuitry is configured to modify the output characteristic of the second audio segment by reducing or muting an output volume of the second audio segment.

15. The system of claim 11, wherein the control circuitry is further configured to:
receive the media asset at a consumption device, wherein receiving the media asset comprises receiving, at the consumption device, live primetime content; and
the control circuitry is further configured to:
transcribe the audio stream into a corresponding text;
identify the plurality of audio segments of the corresponding text attributed to sound profiles;

compare the identified plurality of audio segments with the user profile associated with preferences of sound profiles, wherein the user profile comprises a list of sound profiles a user prefers;

determine, based on comparing, whether the identified plurality of audio segments matches a sound profile from the list of sound profiles; and in response to determining the identified plurality of audio segments does not match the sound profile from the list of sound profiles, present the corresponding text to the consumption device.

16. The system of claim 11, wherein the control circuitry is further configured to:

identify the plurality of audio segments from the audio stream, wherein the control circuitry is further configured to identify the plurality of audio segments by:

identifying a base frequency of each audio segment of the plurality of audio segments;

determining a plurality of voice characteristics for each respective audio segment; and storing, in association with each audio segment, the base frequency and the plurality of voice characteristics.

17. The system of claim 16, wherein the plurality of voice characteristics includes at least one characteristic selected from a group consisting of pitch, intonation, accent, loudness, and rate.

18. The system of claim 11, wherein the control circuitry is further configured to:

generate a sound profile of each audio segment of the plurality of audio segments, wherein the control circuitry is further configured to generate the sound profile by:

transcribing each audio segment into a corresponding text;

processing the corresponding text to determine a sound source;

comparing the sound source with user preferences of a list of sound sources;

determining, based on the comparing, whether the sound source matches the list of sound sources; and in response to the determining the sound source does not match the list of sound sources, muting each audio segment of the plurality of audio segments whose sound source does not match the list of sound sources.

19. The system of claim 11, wherein the control circuitry is further configured to:

transmit, to a server, preferences associated with the user profile;

search the plurality of audio segments of the media asset for audio segments that are acceptable to the user profile based on the preferences; and transmit, to a consumption device, acceptable audio segments.

20. The system of claim 11, wherein the control circuitry is further configured to:

identify the plurality of audio segments from the audio stream, wherein the control circuitry is further configured to identify the plurality of audio segments by:

receiving a closed caption of the media asset;

searching the closed caption of the media asset to identify the corresponding speaker for each audio segment of the plurality of audio segments;

in response to identifying the corresponding speaker for each audio segment of the plurality of audio segments, comparing each identified speaker to a list of permitted speakers; and in response to the comparing, muting one or more audio segments with identified speakers not on the list of permitted speakers.

* * * * *